W. T. ELLIS.
POWER TRANSMITTING ATTACHMENT FOR MOTOR VEHICLES.
APPLICATION FILED NOV. 10, 1919.
1,362,243.
Patented Dec. 14, 1920.
2 SHEETS—SHEET 2.
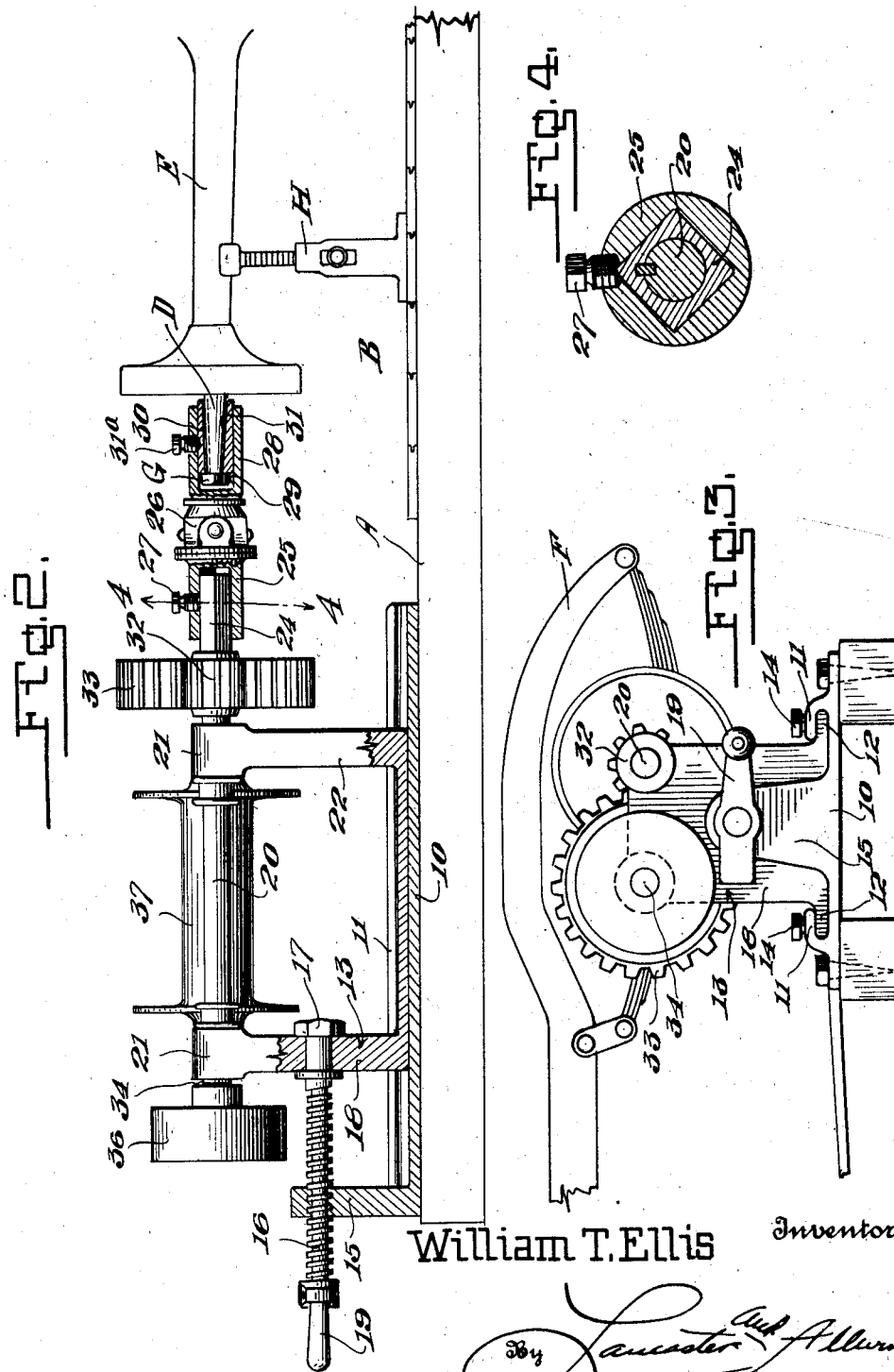
William T. Ellis, Inventor

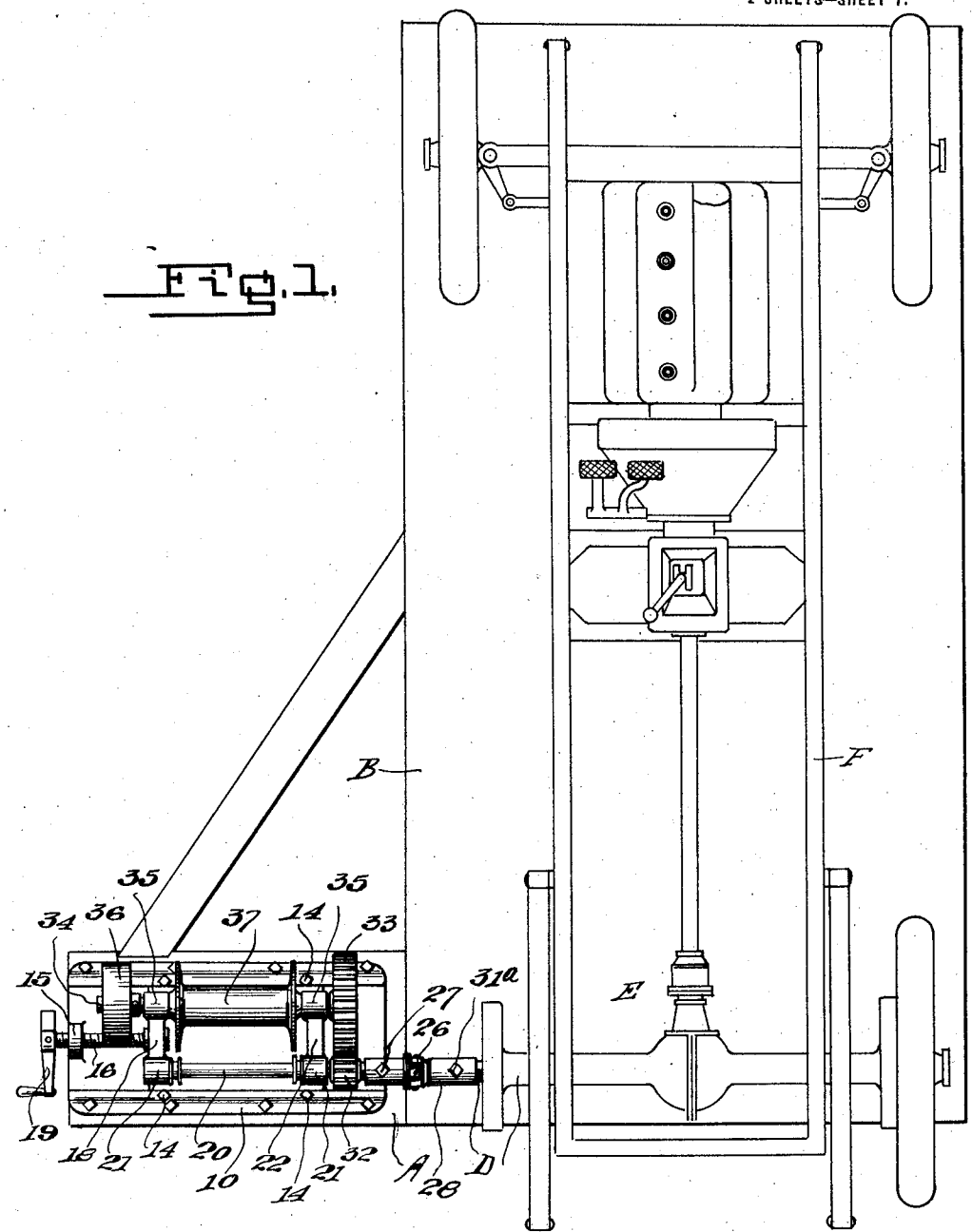

UNITED STATES PATENT OFFICE.

WILLIAM T. ELLIS, OF GOODSPRINGS, NEVADA.

POWER-TRANSMITTING ATTACHMENT FOR MOTOR-VEHICLES.

1,362,243.  Specification of Letters Patent.  Patented Dec. 14, 1920.

Application filed November 10, 1919. Serial No. 336,948.

*To all whom it may concern:*

Be it known that I, WILLIAM T. ELLIS, a citizen of the United States, residing at Goodsprings, in the county of Clark and State of Nevada, have invented certain new and useful Improvements in Power-Transmitting Attachments for Motor-Vehicles, of which the following is a specification.

This invention relates to a power transmitting device particularly designed for use in utilizing the power of motor vehicles, for operating various types of machinery such as a hoisting mechanism, circle saw, ensilage cutter and elevator, pumps, dynamo, power for running such machinery as hay balers or the like.

An object of this invention is to provide a power transmitting mechanism which is adapted to be operatively connected to one of the wheel carrying spindles of the drive axle of a motor vehicle in such manner that the power delivered to the drive axle from the motor of the motor vehicle will be transmitted and reduced in speed and consequently increased in power to a driving shaft which carries suitable transmitting means such as a drum and pulley which are adapted to be connected with any type of machinery desired, such as above specified.

More specifically, the invention comprehends the provision of a power transmitting mechanism comprising a supporting base which slidably carries a supporting frame structure, which is movable longitudinally of the said plate or supporting base, through the rotation of a feed screw for feeding the power transmitting mechanism either toward or away from a motor vehicle arranged along side of the bed plate at one end thereof and to facilitate the connecting of the coupling mechanism of the power transmitting device to one of the spindles of the drive axle of a vehicle and which power transmitting mechanism further comprises in combination with a pair of parallel shafts, a universal joint connection carrying a pair of sleeves at its opposite end, one of which is mounted over and connected to the rectangular end of one of said parallel shafts, while the other sleeve is mounted about a rectangular sleeve provided with a tapered central bore shaped to fit the spindle of the drive axle of the vehicle with which it is to be used, which rectangular sleeve is held in place upon the spindle by the usual wheel retaining nut and is prevented from relative movement with respect to the universal joint carried sleeve in which it engages by means of a set screw.

Other objects of the invention will appear in the following detailed description taken in connection with the accompanying drawings, forming a part of this specification and in which drawings:

Figure 1 is a top plan of the improved power transmitter mechanism showing the same applied to a motor vehicle.

Fig. 2 is a side elevation partly in section of the improved power transmitting mechanism.

Fig. 3 is an end view of the power transmitting mechanism, and

Fig. 4 is a cross section taken on the line 4—4 of Fig. 2.

Referring more particularly to the drawing, wherein like characters indicate like and corresponding parts throughout the several views, the bed plate 10 of the power transmitting mechanism may be mounted either upon the platform structure as illustrated at A or if it is so desired, this platform structure as well as the motor vehicle supporting plant C may be dispensed with and the bed plate thoroughly anchored on the ground or the floor of the garage or at any desired place. This bed plate 10 is provided with a pair of longitudinally extending flanges 11 which over hang the bed plate as clearly shown in Fig. 3 of the drawings and engage over the lateral base flanges 12 of the movable supporting structure, 13 for connecting this movable supporting structure 13 with the bed plate 10 in such manner as to permit adjusted movement of the movable structure 13 longitudinally of the bed plate 10. A plurality of set screws 14 are provided for holding the movable supporting structure 13 in adjusted positions upon the bed plate 10. An upstanding ear 15 is formed upon the outer end of the bed plate 10 and a feed screw 16 is threaded through this ear or standard 15 and is connected in any suitable manner, such as by means of a bolt 17 to the outermost standard 18, of the movable supporting structure 13 so that by rotation of the feed screw 16 through the medium of the crank handle 19 which is mounted upon this outer end, the movable structure 13 may be moved either toward or away from the standard 15, provided of course the set screw 14 has previously been loosened to prevent binding engagement thereof against the base flanges 12.

The shaft 20 is rotatably supported by suitable bearings 21 which are formed upon the standards 18 and 22 of the movable structure 13, and this shaft has the rectangular sleeve 24 keyed upon said end which projects beyond the standard 22. The rectangular shaft is adapted to be inserted in the rectangular bore of a sleeve 25, which is connected to the universal joint structure 26, as clearly shown in Fig. 2 of the drawings, and the set screw 27 is threaded through the sleeve 25 for binding engagement against the rectangular sleeve 24 to prevent relative movement of the sleeves 24 and 25. The second sleeve 28 is connected to the universal structure 26 and projects in the opposite direction therefrom to the sleeve 25. This sleeve 28 is also provided with a rectangular axial recess or bore 29, in which is seated a sleeve 30. The sleeve 30 is provided with an axial tapering bore 31 shaped to snugly fit the spindle D of the rear drive axle E of of the motor vehicle F, and the sleeve 30 is held against longitudinal movement on the spindle D by means of the wheel retaining nut G of the automobile structure, while this sleeve is also held against relative movement with respect to the sleeve 28 by a set screw 31ª which engages through the sleeve 28 and bites into the sleeve 30 as clearly shown in Fig. 2 of the drawings.

The shaft 20 has a pinion 32 mounted thereon which meshes with a gear 33, mounted upon a shaft 34. The shaft 34 is positioned parallel to the shaft 20 and is rotatably supported by suitable bearings 35 which are formed upon the standards 18 and 22 of the movable structure 13. This shaft 34 has a power transmitting pulley 36 thereon which is adapted for connecting by means of a belt or analogous power transmitting means with the machine or mechanism to be operated from the motor vehicle F. A drum 37 is also mounted upon the shaft 34 and is adapted for use when hoisting mechanism is adapted to be operated by the power attachment or for any of a number of other uses to which a drum of this type might be employed.

In connecting the power transmitting attachment to the motor vehicle F, the motor vehicle is driven in close proximity to the power transmitting mechanism and so that the rear axle will be practically in alinement with the shaft 20 after which the wheel which faces the power transmitting attachment and which is mounted upon the rear drive axle E of the motor vehicle is removed. In case it is difficult to remove this wheel, a wheel pulley may be attached to the sleeve 28, and by rotation of the feed screw 16 the power transmitting attachment may be utilized for removing the wheel from the spindle D. After the wheel has been removed from the spindle D, and if the power transmitting attachment is used for this purpose, the wheel pulley is disconnected therefrom and the sleeve 30 is inserted upon the spindle D, after which the nut G is replaced, holding the sleeve 30 against relative movement upon the spindle. The feed screw 16 is then adjusted to force the sleeve 28 over the rectangular sleeve 30 and when this has been done the said screw 31ª is adjusted for securely connecting the sleeves 28 and 30 so that the rotation of the axle spindle D will be transmitted through the sleeves 28 and 30 to the universal joint structure 26 and through this structure to the sleeve 25, sleeve 24, and consequently to the shaft 20 from which it is transmitted to the shaft 34 for operating any suitable type of mechanism. It is understood, however, that after the sleeve 28 has been properly adjusted the set screws 14 are tightened to prevent movement of the movable supporting structure 13 upon the bed plate structure 10 and also that the rear drive axle E of the motor vehicle is jacked up, prior to the removal of the wheel therefrom by any suitable type of vehicle jack structure such as indicated at H in Fig. 2 of the drawings.

Changes in details may be made without departing from the spirit of this invention; but,

I claim:

1. In a power transmitting attachment for motor vehicles, the combination of a bed plate, a supporting structure slidably carried thereby, a shaft rotatably carried by said supporting structure, and means for operatively connecting said shaft to one of the spindles of the drive axle of a motor vehicle.

2. In a power transmitting attachment for motor vehicles, the combination of a bed plate, a supporting structure slidably carried thereby, means for preventing accidental relative movement of the supporting structure and bed plate, a shaft rotatably carried by said supporting structure, and means for operatively connecting said shaft to one of the spindles of a drive axle of a motor vehicle.

3. In a power transmitting attachment for motor vehicles, the combination, of a bed plate, a supporting structure slidably carried thereby, a shaft rotatably carried by said supporting structure, means for operatively connecting said shaft to one of the spindles of a drive axle of a motor vehicle, and a feed screw carried by said bed plate and connected to said supporting structure for moving the latter over the bed plate.

4. In a power transmitting attachment for motor vehicles, the combination of a bed plate, a supporting structure slidably carried thereby, a shaft rotatably carried by said supporting structure, means for operatively connecting said shaft to one of the spindles of a drive axle of a motor vehicle, a feed screw carried by said bed plate and connected to said supporting structure for moving the latter over the bed plate, and means for preventing accidental relative movement of the supporting structure and the bed plate.

5. In a power transmitting attachment for motor vehicles, the combination of a bed plate, a supporting structure slidably carried thereby, a feed screw carried by said bed plate and connected to the supporting structure for moving the supporting structure longitudinally over the bed plate, a power shaft carried by said supporting structure, and means for operatively connecting said shaft to the drive axle of a motor vehicle.

6. In a power transmitting attachment for motor vehicles, the combination of a bed plate, a supporting structure slidably carried thereby, a feed screw carried by said bed plate and connected to the supporting structure for moving the supporting structure longitudinally over the bed plate, a power shaft carried by said supporting structure, means for operatively connecting said shaft to the drive axle of a motor vehicle, means for guiding movement of said supporting structure over said bed plate, and means for preventing accidental relative movement of the supporting structure and bed plate.

7. In a power transmitting attachment for motor vehicles, the combination of a bed plate, longitudinally extending flanges formed upon said bed plate, a supporting structure slidably carried by the bed plate, base flanges upon said supporting structure and engaging beneath said overhanging flanges on said bed plates, means carried by said bed plate and connected to said supporting structure for moving the supporting structure longitudinally over the bed plate, and a power shaft carried by said supporting structure.

8. In a power transmitting attachment for motor vehicles, the combination of a bed plate, longitudinally extending flanges formed upon said bed plate, a supporting structure slidably carried by the bed plate, base flanges upon said supporting structure and engaging beneath said overhanging flanges on said bed plates, means carried by said bed plate and connected to said supporting structure for moving the supporting structure longitudinally over the bed plate, a power shaft carried by said supporting structure, and means for operatively connecting said power shaft to one of the spindles of the drive axle of a motor vehicle.

9. In a power transmitting attachment for motor vehicles, the combination of a supporting structure, a shaft rotatably carried thereby, a universal joint, a pair of oppositely extending sleeves connected to said universal joint, one of said sleeves adapted for connection with said shaft, and a sleeve slidably mounted in the other of said universal joint carried sleeves, said last named sleeve adapted for mounting upon one of the spindles of the drive axle of a motor vehicle, for operatively connecting the shaft to the drive axle of a motor vehicle.

10. In a power transmitting attachment for motor vehicles, the combination, of a power transmitting shaft, a rectangular sleeve keyed upon said shaft, a universal joint, a pair of oppositely extending sleeves carried by said universal joint, one of said sleeves adapted for engagement about said rectangular shaft carried sleeve, and a sleeve removably mounted in the other of said universal joint carried sleeves, said last named sleeve provided with a tapered bore adapted to fit about the spindle of the drive axle of a motor vehicle for operatively connecting said power transmitting shaft to the motor vehicle drive axle.

11. In a power transmitting attachment for motor vehicles, the combination, of a power transmitting shaft, a rectangular sleeve keyed upon said shaft, a universal joint, a pair of oppositely extending sleeves carried by said universal joint, one of said sleeves adapted for engagement about said rectangular shaft carried sleeve, a sleeve removably mounted in the other of said universal joint carried sleeves, said last named sleeve provided with a tapered bore adapted to fit about the spindle of the drive axle, of a motor vehicle for operatively connecting said shaft to a motor vehicle drive axle, and set screws carried by said universal joint carried sleeve and adapted for engagement with said removable sleeve and said rectangular sleeve to prevent relative movement of the universal joint carried sleeve, shaft and removable sleeve.

12. In a power transmitting attachment for motor vehicles, the combination of a bed plate, a supporting structure carried thereby, a shaft rotatably carried by said supporting structure, a universal joint, sleeves carried by said universal joint and projecting in opposite directions therefrom, one of said sleeves adapted for connection with said shaft, and a removable sleeve mounted in the other of said universal joint carried sleeves and bored to snugly fit the spindle of the drive axle of a motor vehicle.

13. In a power transmitting attachment for motor vehicles, the combination of a bed plate, a supporting structure carried thereby, a shaft rotatably carried by said supporting structure, a universal joint, sleeves carried by said universal joint and projecting in opposite directions therefrom, one of said sleeves adapted for connection with said shaft, a removable sleeve mounted in the other of said universal joint carried sleeves and bored to snugly fit the spindle of the drive axle of a motor vehicle, and a feed screw carried by said bed plate and connected to said supporting structure for moving the supporting structure longitudinally over the bed plate.

14. In a power transmitting attachment for motor vehicles, the combination of a bed plate, a supporting structure carried thereby, a shaft rotatably carried by said supporting structure, a universal joint, sleeves carried by said universal joint and projecting in opposite directions therefrom, one of said sleeves adapted for connection with said shaft, a removable sleeve mounted in the other of said universal joint carried sleeves and bored to snugly fit the spindle of the drive axle of a motor vehicle, a feed screw carried by said bed plate and connected to said supporting structure for moving the supporting structure longitudinally over the bed plate, and means for preventing accidental relative movement of the supporting structure and bed plate.

15. In a power transmitting attachment for motor vehicles, the combination of a bed plate, a supporting structure carried thereby, a shaft rotatably carried by said supporting structure, a universal joint, sleeves carried by said universal joint and projecting in opposite directions therefrom, one of said sleeves adapted for connection with said shaft, a removable sleeve mounted in the other of said universal joint carried sleeves and bored to snugly fit the spindle of the drive axle of a motor vehicle, a feed screw carried by said bed plate and connected to said supporting structure for moving the supporting structure longitudinally over the bed plate, means for preventing accidental relative movement of the supporting structure and bed plate, a second shaft rotatably carried by said supporting structure, means operatively connecting the first and second named shafts, and a power transmitting pulley carried by said last named shaft.

16. In a power transmitting attachment for motor vehicles, the combination of power transmitting shaft, means operatively connecting said shaft to a spindle of the drive axle of a motor vehicle, and a universal joint interposed between the power transmitting shaft and its operating means.

WILLIAM T. ELLIS.